G. H. L. DEBAECKER.
APPARATUS FOR LIFTING AND TRANSPORTING GLASS AND OTHER PLANE SURFACE ARTICLES.
APPLICATION FILED JAN. 30, 1920.

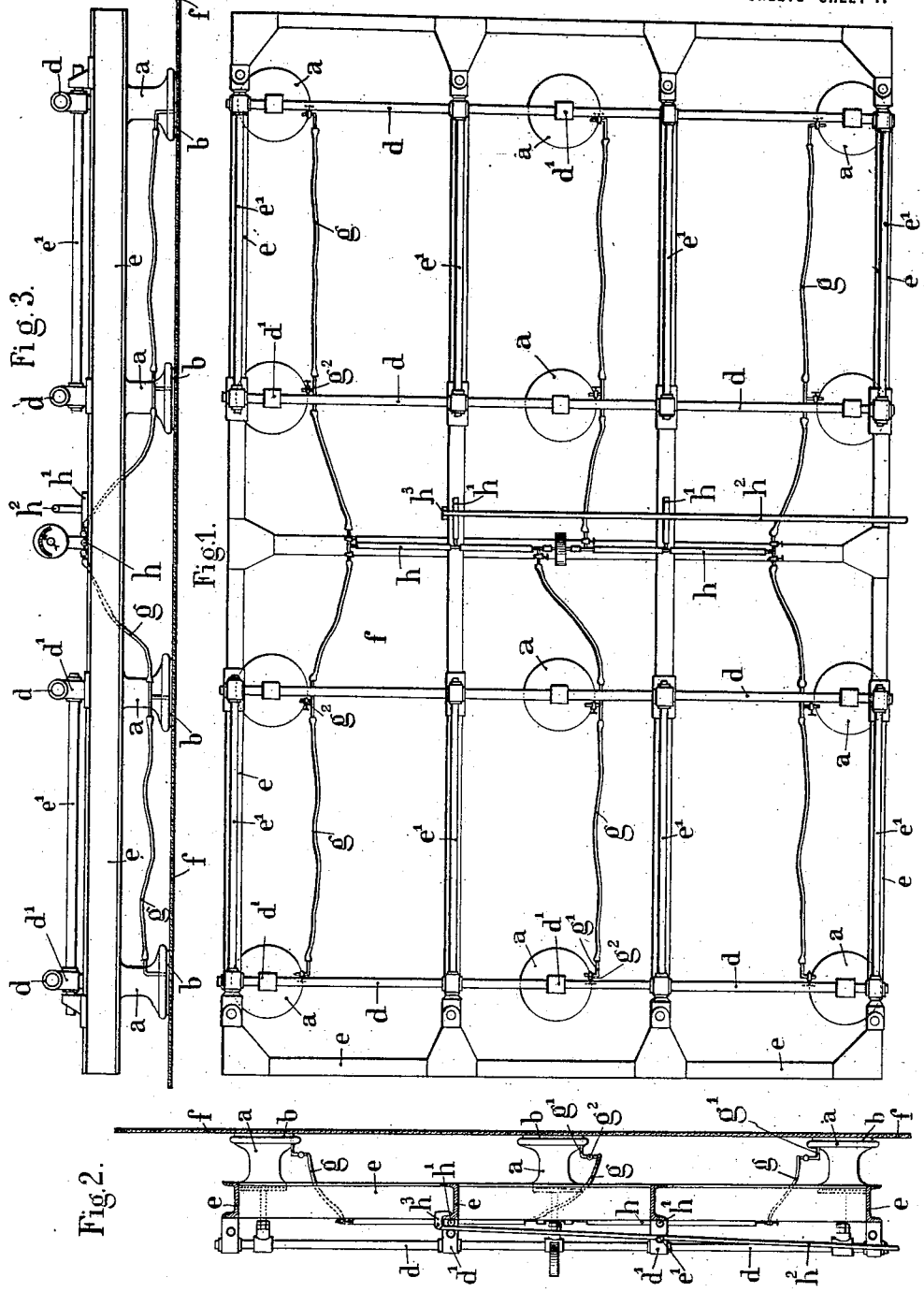

1,373,997.

Patented Apr. 5, 1921.

INVENTOR
GEORGES HENRI LÉON DEBAECKER
BY
ATTORNEYS

UNITED STATES PATENT OFFICE.

GEORGES HENRI LÉON DEBAECKER, OF SAS-DE-GAND, NETHERLANDS, ASSIGNOR TO SOCIETÉ ANONYME DES MANUFACTURES DES GLACES ET PRODUITS CHIMIQUES DE SAINT-GOBAIN, CHAUNY & CIRCY, OF PARIS, FRANCE, A CORPORATION OF FRANCE.

APPARATUS FOR LIFTING AND TRANSPORTING GLASS AND OTHER PLANE-SURFACE ARTICLES.

1,373,997. Specification of Letters Patent. Patented Apr. 5, 1921.

Application filed January 30, 1920. Serial No. 355,213.

*To all whom it may concern:*

Be it known that I, GEORGES HENRI LÉON DEBAECKER, a citizen of the Republic of France, and a resident of Sas-de-Gand, Netherlands, have invented new and useful Improvements in Apparatus for Lifting and Transporting Glass and other Plane-Surface Articles, of which the following is a specification.

It has already been proposed to lift and transport sheet glass or other plane surface articles by arrangements comprising suction chambers connected by a tube system with a reservoir which is adapted to be exhausted to cause the suction chambers to adhere to the surface so that the article can be lifted together with the chambers.

The present invention has for its object to provide means for obtaining a vacuum in the chambers automatically by simply raising them after they have been applied to the pieces to be lifted, and without the use of any special auxiliary arrangement for producing a vacuum.

To this end, according to the invention, the suction chambers are in the form of cylinders each containing a piston, the piston rods being suspended from bars mounted in a frame in such a manner that after the cylinders have been lowered down on to the surface of the glass to be lifted, it is only necessary to raise the frame to cause the pistons to move in the cylinders, thus producing a partial vacuum therein sufficient to cause the glass to adhere to the cylinders so that it can be lifted and transported.

An air-tight ring consisting of a flexible or soft rubber tube is fitted into a groove at the lower end of each cylinder, in such a manner as to provide a large bearing surface when applied to the surface of the object to be lifted and to fit tightly and evenly on the said surface.

The piston rods are slidably mounted on the bars of the frame, said bars being mounted so as to slide in a direction perpendicular to their axes, so that the suction chambers or cylinders can be brought to any desired point over the article to be lifted, thus enabling glass or articles of all shapes and sizes to be lifted and transported.

The various suction chambers are connected together by a tube system and to a main pipe. This main pipe is adapted to be put into communication with the air when it is desired to allow the air beneath the pistons to escape when the frame is lowered on to the piece to be lifted or when it is desired to admit air to destroy the vacuum when the piece is to be detached from the suction chambers.

For this purpose the main pipe is provided with one or more nozzles adapted to be closed by cocks or taps, pinch cocks or other known devices in such a manner as to effect a perfectly air-tight closure, these cocks, taps, pinch cocks or other devices being operated by a single central. Further, the connection of each suction chamber with the main pipe is provided with separate closing means so that those chambers which are not required for use, owing to the shape or size of the piece to be lifted, may be cut out.

To enable the invention to be fully understood it will now be described by reference to the accompanying drawings in which one suitable construction according to the invention is shown.

Figure 1 is a top plan view of a frame with suction chambers attached;

Fig. 2 is a front elevation of the arrangement shown in Fig. 1 and

Fig. 3 is a side elevation thereof;

As shown, the suction chambers consist of a number of cylinders $a$, each having an air-tight ring $b$ held in an undercut groove $a'$ in the lower end thereof and each having a piston $c$ adapted to be moved by a rod $c^1$ linked to a bar $d$ on the frame $e$.

Figure 5:
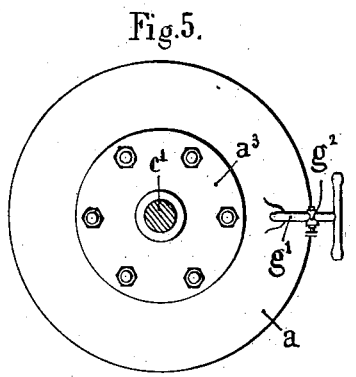
Fig. 5 is a horizontal section on the line 5—5 Fig. 4.

Each cylinder (Figs. 5 and 6) is shaped like a railway wagon buffer and is bored out and trued up to the correct diameter for the piston $c$; the bottom of the cylinder is flat and has a central hole $a^2$ in which metallic gauze is mounted for preventing dirt entering the cylinder. The top of each cylinder is closed by a cover plate $a^3$ held by bolts, and serves to guide the piston rod $c^1$ which is formed in one piece with the piston, the latter being of substantial depth to act as an additional guide preventing jamming in the cylinder. The lower end of the piston has a projection $c^2$ which engages with the hole $a^2$ so as to reduce the space as much as possible. The upper end of the piston rod is screw-threaded to receive the eye $d^1$ which carries the bar $d$ of the frame. An oil seal $c^3$ of sufficient thickness is provided on top of the piston to insure that there is no air leakage between the two faces of the piston. When the piston $c$ is at the height of its stroke the oil is contained in a cut out portion $a^4$ in the top of the cylinder which forms an oil reservoir and the piston is thus automatically lubricated at each stroke. A small hole $a^5$ in the cover $a^3$ allows the escape of air trapped in the cylinder above the piston during the mounting of the latter and also serves for replenishing the oil.

Figure 6:
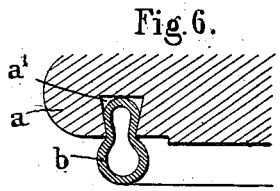
Figs. 6, 7, 8 show the different shapes taken by the air-tight ring mounted on the lower end of each cylindrical suction chamber, also drawn to a larger scale.

The air-tight ring $b$ consists of a soft or flexible rubber tube and it is obtained by providing at both ends of said tube, sloping or chamfered edges, which are brought together and glued together. The ring is shown in Fig. 6 in the position it assumes when the cylinder is suspended freely from the frame $e$.

Figure 7:
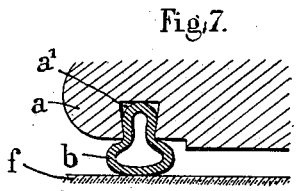

When the frame $e$ with the various cylinders $a$ is lowered on to the glass or piece to be lifted and transported, these rings $b$ are pressed by the weight of the cylinders and frame firmly on to the surface $f$ to be lifted and bed themselves firmly thereon, taking up the shape of the undulations or unevenness of the surface and filling up the hollows (see Fig. 7). When the piston $c$ is raised in its cylinder $a$ the ring $b$ is crushed against the surface $f$ to be lifted due to the partial vacuum produced in the cylinder below the piston. Thus a perfect adherence to the surface and a relatively large bearing surface thereon are obtained.

The frame comprises I or U shaped beams $e$ connected by suitable cross-bars.

Secured to the frame at suitable distance apart, are the bars $e^1$ on which are mounted, so as to slide in a direction perpendicular to their axes, the rods $d$, from which the cylindrical suction chambers are suspended. As the piston rods $c^1$ in turn are slidably mounted on the rods $d$, the various cylinders may be moved to any desired point on the surface of the piece to be lifted, so that the number of suction chambers acting is not limited to the size of the surface.

Figure 4:
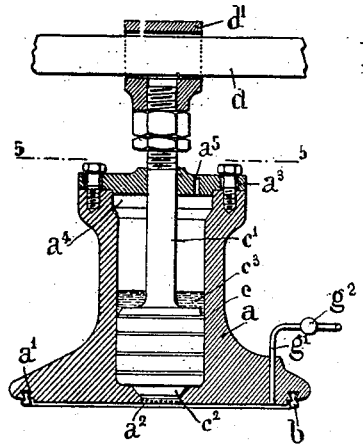
Fig. 4 is a vertical section through one of the cylindrical suction chambers, drawn to a larger scale.

The suction chambers are connected as shown by rubber tubes $g$, connected to the branch of a tube connector $g^1$ screwed into the base of each suction chamber and opening into the inner circumference formed by the air-tight ring $b$ (Fig. 4). These tubes are fitted with cocks $g^2$ permitting communication to be established or broken between the chambers as desired.

The rubber tube system $g$ is connected to a metallic main pipe $h$ arranged across the frame $e$. To this tube $h$ are also connected two rubber tubes $h^1$ which normally communicate with the atmosphere. A lever $h^2$ pivoted at $h^3$ on one of the cross bars of the frame allows pressure to be applied to these tubes $h^1$ so as to cut off the main pipe $h$ and consequently the various suction chambers from the atmosphere.

Figure 8:
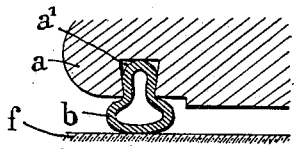

The operation of the above described apparatus is as follows:—The frame $e$ is carried by a moving bridge or other suitable means into position above the piece $f$ to be lifted, all the pistons $c$ then being at the top of their strokes, the cylindrical suction chambers being suspended by their covers as the pistons come up against same in this position. The various cylinders are then lowered on to the surface $f$, the lever $h^2$ being raised, that is to say, not pressing on the air tubes $h^1$. The air contained in the cylinders below the pistons escapes by the tube system $g$, $h$, $h^1$, the rubber rings $b$ fit perfectly on the surface $f$ conforming exactly to its shape (Fig. 7). In this position the minimum amount of air at atmospheric pressure is imprisoned in each cylinder beneath each piston. The lever $h^2$ is then pressed down to cut off communication with the atmosphere by the tube system $g$, and the frame $e$ is lifted. The pistons $c$ rise in their cylinders and produce a partial vacuum in the cylinders $a$ below said pistons, sufficient to cause the surface $f$ to adhere to the lower part of the cylinders, crushing in the ring $b$ (Fig. 8). The necessary stroke of the pistons to obtain the desired degree of vacuum for lifting the surface $f$ can easily be calculated. In practice, it is preferable to lift the frame by means of the pistons coming against the cover plates of their respective cylinders, as by this means a sufficiently great adherence is obtained.

The partial vacuum is maintained perfectly in the cylinders $a$ below the pistons $c$ and the transport of the glass adhering to the frame can be made with the utmost security; shaking has absolutely no effect on the adherence of the glass.

To place the glass on a table, the frame is lowered until the glass rests on the table and the lever $h^2$ is moved into the open position, which allows air to reënter through the tubes $h^1$ into the tube $h$ and the tube system $g$ into the space beneath the pistons $c$ in the cylinders. The glass then releases itself from the rubber rings $b$ and the frame is ready to be used again. In a case where a portion of the glass breaks, at a corner, for example, it is only necessary to isolate those suction chambers on the broken piece from the rest by closing the cocks $g^2$ of the connectors $g^1$ on such chambers so as to prevent the entry of air into the other chambers.

This apparatus is auto-pneumatic, since the partial vacuum which causes the adherence of the glass or other article to be lifted and transported is produced by the lifting of the frame itself, contrary to known arrangements in which the vacuum is produced in a special reservoir connected to the suction chambers. Apparatus constructed according to the invention is always ready for instant and continuous work, the operations may succeed one another without loss of time, the great power of adherence and the perfect air-tightness of the system gives complete security during transport. The apparatus is simple, strong and easily managed.

Having now particularly described and ascertained the nature of my said invention and in what manner the same is to be performed, I declare that what I claim is:—

1. Apparatus for lifting and transporting glass and other plane surface articles, comprising a movable lifting frame, a plurality of suction chambers carried by the said frame, each suction chamber comprising a cylinder and a piston, the piston rods of the said cylinders being suspended from the frame, means at the contacting end of the suction chamber to make air-tight joint with the surface of the article to be lifted when the frame is lowered to operative position, the piston moving in the cylinders to produce a partial vacuum therein when the frame is raised.

2. Apparatus for lifting and transporting glass and other plane surface articles, comprising a movable lifting frame, a plurality of suction chambers carried by the said frame, each suction chamber comprising a cylinder and a piston, the piston rods of the said cylinder being suspended from the frame, means at the contacting end of the suction chamber to make air-tight joint with the surface of the article to be lifted when the frame is lowered to operative position, the piston moving in the cylinders to produce a partial vacuum therein when the frame is raised, the means at the contacting end of the suction chamber for making a tight joint with the surface of the article to be lifted comprising an india rubber, tubular ring let into an annular recess in the end of the suction chamber and having a large bearing surface upon the article to be lifted and contacting closely with and conforming exactly to the surface of the said article.

3. In the construction specified in claim 1, means for adjusting the position of the suction chambers on the frame.

4. In the construction specified in claim 1, means for adjusting the position of the suction chambers both transversely and longitudinally with respect to the frame.

5. A construction as specified in claim 1, in combination with a main, a series of branch tubes or rubber connecting said main with the several suction chambers, and normally open to atmosphere, and means to close said tubes to seal the tube system of the several suction chambers when it is desired to create a partial vacuum in the suction chambers, said means being operable to open said rubber tubes when it is desired to admit air to the suction chambers.

In testimony whereof I have signed my name to this specification.

GEORGES HENRI LÉON DEBAECKER.

Witnesses:
C. A. WAUBERT,
M. ALVARADY.